Aug. 29, 1961 J. L. LOVETT 2,998,591
AUDIBLE FISH ALARMS
Filed Jan. 21, 1955 3 Sheets-Sheet 1

INVENTOR
JOSEPH LEONARD LOVETT
By Elmer J. Horn
ATTORNEY

United States Patent Office 2,998,591
Patented Aug. 29, 1961

2,998,591
AUDIBLE FISH ALARMS
Joseph Leonard Lovett, Palos Verdes Estates, Calif., assignor to Raytheon Company, a corporation of Delaware
Filed Jan. 21, 1955, Ser. No. 483,346
6 Claims. (Cl. 340—1)

This invention relates to audible fish alarms and more particularly to such alarms as applied to existing depth sounders of either the indicator or recording type.

Either indicating or recording depth sounders are capable of showing either a single large fish or a school of fish beneath a vessel as an echo above the bottom. However, the user must give all his attention to the depth sounder if he is to notice the appearance of such echoes in time for them to do him any good. This is wasteful of the crew's time, particularly in a small boat with a limited crew. It would be desirable to have an audible indication of a reflection from an object closer than the expected bottom, both for the purpose of indicating the presence of fish below the vessel and to indicate the shoaling of the water below the vessel which might signify the danger of going aground or the approach to a bank or other fishing grounds. Such an audible signal would indicate that the depth sounder should be observed for information of interest. Thus, the user can safely ignore the depth sounder except when the alarm has sounded. In this way a maximum of information can be obtained from the depth sounder with a minimum of time spent observing it.

This is accomplished in the present invention by keying a multivibrator under control of the keying impulse of the depth sounder. The differentiated lagging edge of this multivibrator pulse is used to trigger on a gating pulse generator that produces a pulse having a duration corresponding to the range of depths between a point somewhat below the surface and a point somewhat above the expected bottom. In addition to producing a normal indication on the indicator dial or a mark on the record, any echo pulse occurring during this interval in which the gate is open also keys on an audio oscillator that causes a loud-speaker to give out a burst of sound. It can also be used to ring a bell to give warning that the depth sounder requires attention.

Other and further objects and advantages of this invention will be apparent as the description thereof progresses, reference being had to the accompanying drawings wherein.

Figure 1:
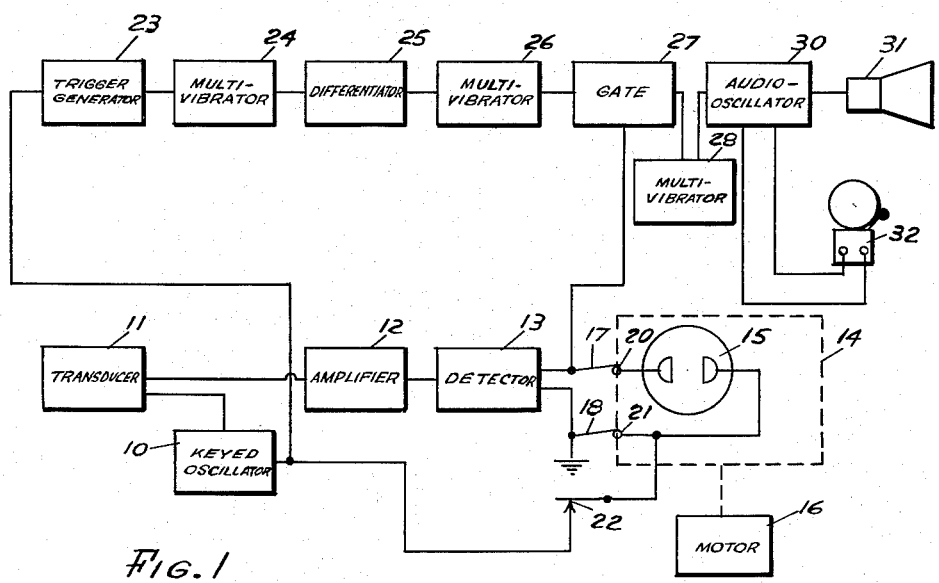
FIG. 1 is a block diagram of an indicator type depth sounder incorporating the invention.
Figure 2:
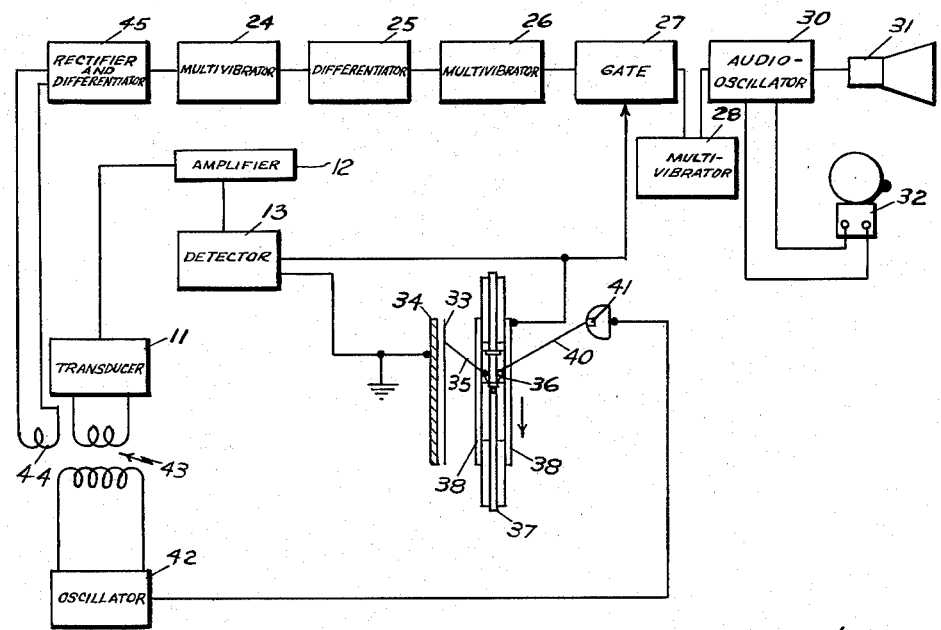
FIG. 2 is a block diagram of a recording type depth sounder incorporating the invention.
Figure 4:
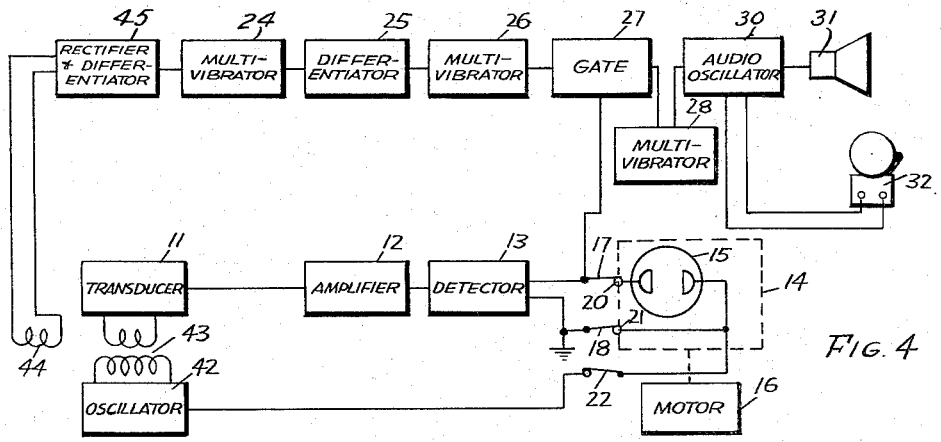
Figure 5:
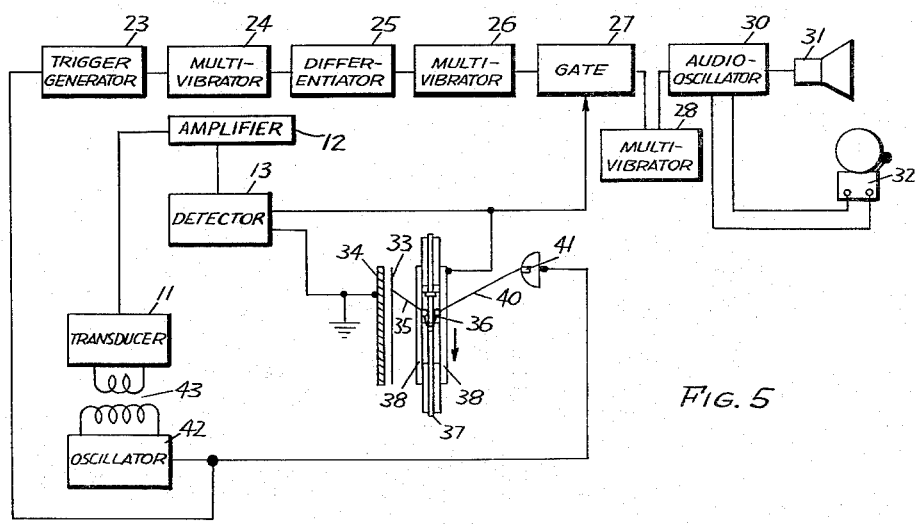

FIG. 4 is a schematic diagram of the circuit of an embodiment of the alarm of the invention using the rectified and differentiated output of the keyed oscillator as in the circuit of FIG. 2 in place of the trigger generator of FIG. 1; and FIG. 5 is a schematic diagram of the circuit of the embodiment of the alarm of the invention using the trigger generator of FIG. 1 in place of the rectified and differentiated output of the keyed oscillator as used in the circuit of FIG. 2.

In FIG. 1 the reference numeral 10 designates a keyed oscillator that produces electrical oscillations which are applied to a transducer 11 of any of the well-known types that propagates pulses of compressional wave energy and translates reflected waves of this type into electrical oscillations which are applied to an amplifier 12. After amplification in amplifier 12, these pulses are detected in a detector 13 and applied to the indicator 14. Indicator 14 may most conveniently be of the type disclosed in the U.S. Patent No. 1,667,540, issued April 28, 1928, to Herbert G. Dorsey in which a light 15 is rotated by motor 16 behind a dial with a scale (not shown) and lights when a reflected signal appears at the output of the detector 13 over brushes 17 and 18 and slip rings 20 and 21. As the light passes the zero mark on the scale, a pair of contacts 22 are closed to key on the oscillator 10. Any of the various known ways of keying an oscillator may be used for this purpose. The closing of the contacts 22 causes a trigger pulse to be generated by the trigger generator 23 in any suitable manner. This trigger pulse, when applied to a first multivibrator 24, causes the latter to produce a unidirectional negative going pulse that is differentiated in a differentiating circuit 25. The positive going portion of this pulse is used to trigger a second multivibrator that produces a negative going gating pulse that, when applied to the grid of a gate tube 27, permits the latter to pass the output of the detector 13 in the form of a pulse that triggers a third multivibrator 28. Thus, multivibrators 24 and 26 and the intermediate differentiating circuit 25 form a gating pulse generator. Multivibrator 28 produces a negative going pulse that actuates an audio oscillator 30 that in turn drives a speaker 31 and operates a bell 32 for an appreciable time. The purpose of the third multivibrator is to extend the period of oscillator so that an audible tone is heard from the speaker in the form of a single "ping" for each echo that comes through the gate. If the oscillator were allowed to oscillate only for the actual duration of the echo, it would be so short that only a click would be heard in the loud-speaker rather than a tone. With this third multivibrator the speaker 31 will produce a ping every time an echo is received from a depth less than the expected bottom depth. This type of indication is useful as a means for distinguishing a single fish from a school of fish. A single fish would produce a single ping while a school of fish would produce almost continuous sound. Often a commercial fishing boat is only interested in a school of fish. This distinction is useful when setting a net to catch a school of fish. It is desirable to be able to tell whether the vessel is directly over the edge of the school or over its center. It is not desirable to be directly over the school when setting the net as that will disturb the fish. It is best to set the net about the edges of the school. The operator can then continue to navigate the vessel guided by the pings which merge into a continuous tone when the vessel is directly over the school. This makes the setting of the net more efficient.

In the modification of FIG. 2 the alarm circuit of the invention is shown as adapted for use with the recording type depth sounder in which a strip of recording paper 33 is pulled across a platen 34 of conductive material under a stylus 35 also of conductive material and carried on a slipper 36 of conductive material attached to a string or belt 37 that moves in a direction such as to carry the stylus downward across the paper in a direction at right angles to the motion of the paper 33. The slipper 36 travels in a track 38 also of conductive material. The stylus has a second arm 40 that makes contact with a piece 41 of conductive material when the other end of the stylus touches the upper edge of the paper 33. As the platen 34 and the paper 33 are at ground potential and the piece 41 is connected to the grid of the tube of an oscillator 42 this serves to ground the grid of the oscillator 42. The output of the oscillator is coupled to the transducer 11 through a transformer 43. A portion of this output is coupled through a third winding 44 on the transformer 43 to a rectifying and differentiating circuit 45 that produces a negative going pulse that triggers the multivibrator 24, the output of which when differentiated in differentiator 25 triggers the multivibrator 26 that in turn opens the gate 27 to permit the output of the transducer 11, after amplification in amplifier-detector 12, to trigger the multivibrator 28 the output of which is applied to the audio oscillator 30 to operate a speaker 31 and a bell 32, as before, in addition to being applied to the stylus 35 to make a record. As in the circuit of FIG. 1, the keying action of the keying contacts 40—41 can be applied to a trigger generator such as the generator 23 of FIG. 1, that may be substituted for the rectifier and differentiator 45. The rest of the operation is the same.

Figure 3:
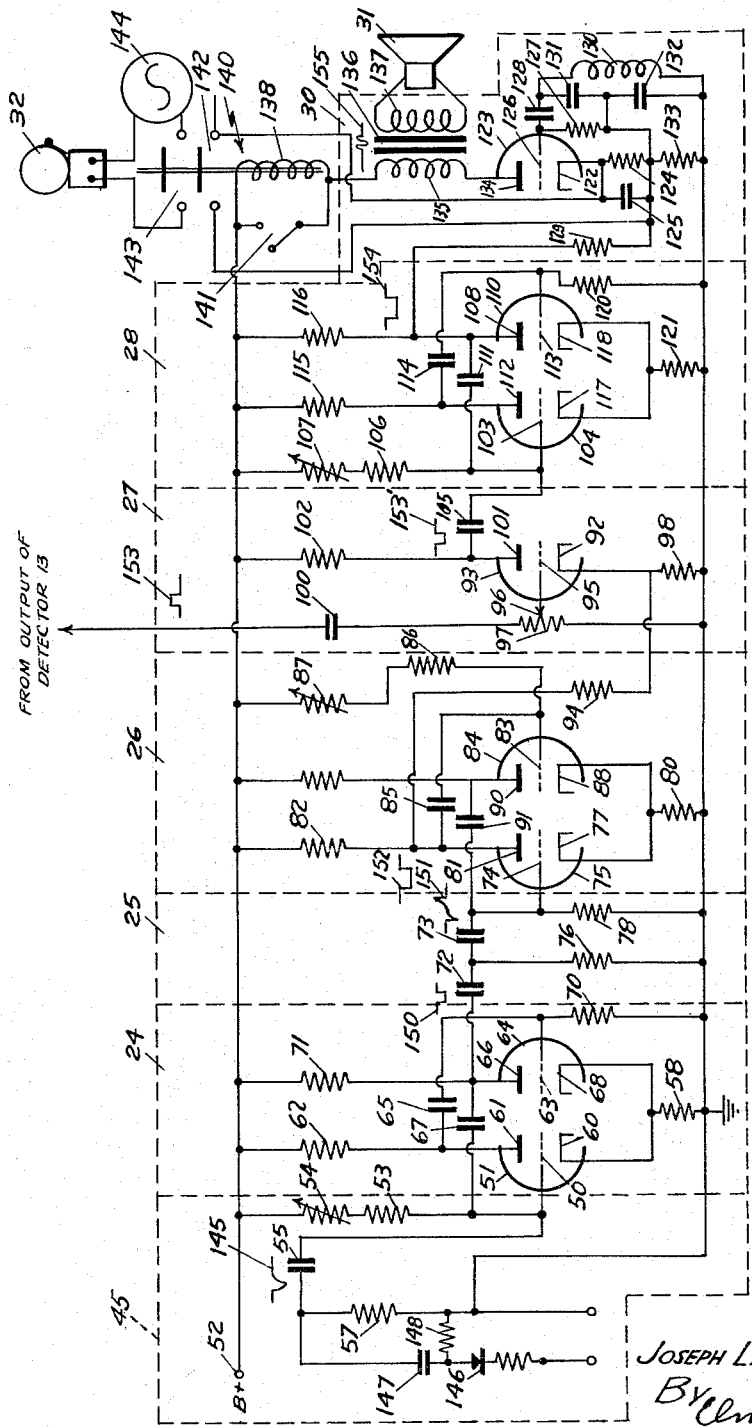
FIG. 3 is a schematic diagram of the circuit of an embodiment of the alarm of the invention.

The alarm circuit proper is shown in greater detail in FIG. 3, in conjunction with the rectifier-differentiator circuit 45 of FIG. 2. The grid 50 of a triode 51, one of the tubes of the multivibrator 24, is connected to a source 52 of positive potential through a fixed resistor 53 and a variable timing resistor 54. It is also coupled through a capacitor 55 and the rectifier-differentiator circuit 45 to the keying contact 40 shown in the circuit in FIG. 2. The grid 50 is also coupled through capacitor 55 and resistors 57 and 58 to the cathode 60 of the triode 51. The plate 61 of the triodet 51 is connected to the source 52 of positive potential through a resistor 62 and is also coupled to the grid 63 of the second triode 64 of the multivibrator 24 though a capacitor 65. The grid 50 is coupled to the plate 66 of the triode 64 through a capacitor 67. The grid 63 is connected to the cathode 68 through a resistor 70 and the cathode resistor 58. The plate 66 of the triode 64 is connected to the source 52 of positive potential through a resistor 71 and is coupled through capacitors 72 and 73 to the grid 74 of the first triode 75 of the second multivibrator 26. The junction of the capacitors 72 and 73 is connected to the cathode 68 through a resistor 76 and the cathode resistor 58. The grid 74 is connected to the cathode 77 of the triode 75 through resistors 78 and 80. The plate 81 of the triode 75 is connected to the source 52 of positive potential through a resistor 82. It is also coupled to the grid 83 of the second triode 84 of the multivibrator 26 through a capacitor 85. The grid 83 is connected to the source 52 of positive potential through a fixed resistor 86 and a variable resistor 87, the latter being the timing resistor for the multivibrator 26, as is common in the art, and providing a control of the duration of the gating pulse 152. The cathode 88 is connected to the resistor 80. The plate 90 is coupled to the grid 74 of the tube 75 through a capacitor 91. The plate 81 of the triode 75 is connected to the cathode 92 of a gate triode 93 through a resistor 94. The grid 95 of the triode 93 is connected to the arm 96 of a potentiometer 97 one end of which is connected to the cathode 92 through a resistor 98 and the other end of which is coupled to the output of the detector 13 through a capacitor 100. The plate 101 is connected to the source 52 of positive potential through a resistor 102 and is also coupled to the grid 103 of the first triode 104 of the third multivibrator 28 through a capacitor 105. The grid 103 is also connected to the source 52 of positive potential through resistors 106 and 107. The grid 103 is also coupled to the plate 108 of the second triode 110 of the multivibrator 28 through capacitor 111. The plate 112 of the triode 104 is coupled to the grid 113 of the triode 110 through a capacitor 114 and is also connected to the source 52 of positive potential through a resistor 115. The plate 108 of the triode 110 is connected to the source 52 of positive potential through a resistor 116. The grid 113 of the triode 110 is connected to the cathodes 117 and 118 of the triodes 104 and 110 through resistors 120 and 121. The plate 108 of triode 110 is connected to the cathode 122 of a triode 123 in the audio oscillator 30 through resistors 129 and 124. The resistor 124 is shunted by a capacitor 125. The grid 126 of the triode 123 is connected to the cathode 122 by resistors 127 and 124 and is also coupled to the cathode through capacitor 128, a tuned circuit comprising inductance 130 and capacitors 131 and 132 and resistors 133 and 124. The junction of capacitors 131 and 132 is connected to the junction of resistors 124 and 133. The plate 134 of the triode 123 is connected to the source 52 of positive potential through the primary 135 of the transformer 136 the secondary 137 of which is connected to the speaker 31, and through the coil 138 of a relay 140. The coil 138 is shunted by a normally open switch 141. The relay 140 has a pair of normally open contacts 142 shunted across the capacitor 125 and a second pair of normally open contacts 143 connected in series with a source 144 of alternating potential and the bell 32.

In the operation of the circuits shown in FIG. 3 when the keying contact 40 closes at the propagation of a pulse of compressional wave energy, a sharp negative going pulse is produced by the rectification of a portion of the output of the oscillator 42 by the rectifier 146. The rectified output is differentiated in the differentiator 45 comprising capacitor 147 and resistors 148 and 57. This pulse, represented by waveform 145, triggers multivibrator 24 to produce a pulse of waveform 150 at the plate 66 of the triode 64. This pulse is differentiated in the differentiator 25 comprising capacitor 72 and resistor 76 to produce the waveform 151, the positive going portion or lagging edge of which serves to trigger the multivibrator 26. The purpose of the first multivibrator 24 and the differentiator 25 is to delay the opening of gate 27 in response to pulse 145 so that no signals will be received for a short time after the pulse of compressional wave energy is propagated, in order to prevent false indications. As is evident from an inspection of FIG. 3, the leading or left-hand edge of pulse 150 corresponds in time to pulse 145. The output 151 of differentiator 25 includes a leading edge or negative going peak which corresponds in time to the leading edge of pulse 150, while the lagging edge or positive going peak of waveform 151 corresponds in time to the lagging edge of pulse 150. The leading edge of the gating pulse 152 corresponds in time to the positive going peak of waveform 151, and the opening of the gate is thus delayed in time by the width of pulse 150. That is to say, from the time of actuation of the transducer (a time defined by pulse 145 and the leading edge of pulse 150), the opening of the gate is delayed by a time equal to the period of multivibrator 24. This time delay is thus made variable by means of variable timing resistor 54, in a manner well known to the art of monostable multivibrators. The device can be operated without this delay, but not as reliably.

When triggered, the multivibrator 26 produces a negative going pulse of the waveform 152 (the gating pulse) having a duration corresponding to a depth somewhat less than the expected average depth of the bottom so as to prevent confusion between signals from the bottom and those from a fish. The time during which gate 27 remains open, viz., the width of pulse 152, is determined by the variable timing resistor 87 in the second or output multivibrator 26. Thus, the proper adjustment of timing resistors 54 and 87 determines the times of opening and closing the gate in order to avoid echo signals reflected from positions closely adjacent the transducer (such as the transducer-water interface) on the one hand, and, on the other hand, from positions corresponding to the expected bottom of the body of water.

A signal appearing in the output of the detector 13 will have the form 153, and when the gating pulse 152 simultaneously appears at the cathode 92 of the gate tube 93, a negative pulse 153' of similar (but inverted) form will appear at the plate 101 of the tube 93 and be coupled to the grid 103 of the first triode 104 of the multivibrator 28 to trigger it to produce a negative going pulse 154 that is applied across the cathode resistor 133 to reduce the normally negative bias on the grid 126 of a triode 123 in the audio oscillator 30 to permit it to oscillate and produce a sound in the loud-speaker 31 in the form of a burst of audio frequency oscillations of the waveform 155, and cause the bell 32 to sound due to the closing of the contacts 143 by the energizing of the relay 140 due to current flowing through its coil 138 when the oscillator 30 oscillates.

The purpose of the last-mentioned multivibrator 28, as expalined above, is to extend the period of oscillation so that the loud-speaker will sound for a sufficient length of time in response to a signal of very short duration to give at least a "ping." The purpose of the switch 141 is to select between two types of audible echo indication. With the switch 141 in its closed position, relay 138 does not actuate. In this case one "ping" is heard for every echo that comes through the gate. With the switch 141 open, the first echo that comes through the gate actuates relay 138 closing contacts 142 and 143. Contacts 142 remove bias from the oscillator tube 123, causing it to oscillate continuously and the bell to ring continuously until the operator actually throws switch 141 to its closed position. In addition, other forms of delay producing circuits may be substituted for the multivibrator 24 and the differentiator 25. A portion of the oscillator output may be used with rectifier and differentiator similar to that shown in FIG. 2 to initiate the alarm action in the circuit shown in FIG. 1 in place of the trigger generator 23 shown there.

It has been indicated above that the rectified and differentiated output of the keyed oscillator may be used with the circuit of FIG. 1 in place of the trigger generator 23, and that the trigger generator of FIGS. 1 and 5 can be used instead of the rectifier-differentiator circuit 45, as is illustrated in FIGS. 4 and 5. The ouput of the keyed oscillator 42 is obtained in FIG. 4 by adding a third winding 44 to the transformer 43 coupling the output of the oscillator 42 to the transducer 11. This third winding 44 is connected across the input of a rectifier-differentiator 45, the output of which is coupled to the input of the multivibrator 24. Similarly, in FIG. 5 the keying impulse is obtained by direct connection with the line including the keying contact 41, and is applied to a trigger generator 23. The remainder of the circuits operate as before.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An echo ranging system comprising a source of periodic electrical oscillations, means for keying said source, transducer means coupled to said source for radiating signals derived from said electrical oscillations and receiving corresponding reflected echo signals, indicator means, circuit means interconnecting said transducer means and said indicator means for energizing the latter with the electrical output of the former, first differentiating means coupled to said source of oscillations for differentiating a portion of the output thereof, a gating pulse generator comprising a first multivibrator, a second differentiating means and a second multivibrator, said first multivibrator being coupled to the output of said first differentiating means for activation in unison with said oscillation source under the control of said keying means to provide an output wave having a leading and a lagging edge, said second differentiating means being connected to the output of said first multivibrator to produce a delayed pulse corresponding in time with such lagging edge, and said second multivibrator being coupled to the output of said second differentiating means for activation by such delayed pulse to provide a gating pulse, a gating device having an input coupled to the output of said second multivibrator and to said interconnecting means to pass signals from the latter upon the occurrence of a gating pulse from the former, and audible alarm means coupled to the output of said gating device to provide an alarm upon the passage of a signal through said gating device.

2. An echo ranging system comprising a source of periodic electrical oscillations, means for keying said source, transducer means coupled to said source for radiating signals derived from said electrical oscillations and receiving corresponding reflected echo signals, indicator means of the recording type, means interconnecting said transducer means and said indicator means for energizing the latter with the electrical output of the former, first differentiating means coupled to said source of oscillations for differentiating a portion of the output thereof, a gating pulse generator comprising a first multivibrator, a second differentiating means and a second multivibrator, said first multivibrator being coupled to the output of said first differentiating means for activation in unison with said oscillation source under the control of said keying means to provide an output wave having a leading and a lagging edge, said second differentiating means being connected to the output of said first multivibrator to produce a delayed pulse corresponding in time with such lagging edge, and said second multivibrator being coupled to the output of said second differentiating means for activation by such delayed pulse to provide a gating pulse, a gating device having an input coupled to the output of said second multivibrator and to said interconnecting means to pass signals from the latter upon the occurrence of a gating pulse from the former, and audible alarm means coupled to the output of said gating device to provide an alarm upon the passage of a signal through said gating device.

3. An echo ranging system comprising a source of periodic electrical oscillations, means for keying said source, transducer means coupled to said source for radiating signals derived from said electrical oscillations and receiving corresponding reflected echo signals, indicator means of the flashing light type, circuit means interconnecting said transducer means and said indicator means for energizing the latter with the electrical output of the former, first differentiating means coupled to said source of oscillations for differentiating a portion of the output thereof, a gating pulse generator comprising a first multivibrator, a second differentiating means and a second multivibrator, said first multivibrator being coupled to the output of said first differentiating means for activation in unison with said oscillation source under the control of said keying means to provide an output wave having a leading and a lagging edge, said second differentiating means being connected to the output of said first multivibrator to produce a delayed pulse corresponding in time with such lagging edge, said second multivibrator being coupled to the output of said second differentiating means for activation by such delay pulse to provide a gating pulse, a gating device having an input coupled to the output of said second multivibrator and to said interconnecting means to pass signals from the latter upon the occurrence of a gating pulse from the former, and audible alarm means coupled to the output of said gating device to provide an alarm upon the passage of a signal through said gating device.

4. An echo ranging system comprising a source of periodic electrical oscillations, means for keying said source, transducer means coupled to said source for radiating signals derived from said electrical oscillations and receiving corresponding reflected echo signals, indicator means, circuit means interconnecting said transducer means and said indicator means for energizing the latter with the electrical output of the former, first differentiating means coupled to said source of oscillations for differentiating a portion of the output thereof, a gating pulse generator comprising a first multivibrator, a second differentiating means and a second multivibrator, said first multivibrator being coupled to the output of said first differentiating means for activation in unison with said oscillation source under the control of said keying means to provide an output wave having a leading and a lagging edge, said second differentiating means being connected to the output of said first multivibrator to produce a delayed pulse corresponding in time with such lagging edge, and said second multivibrator being coupled to the output of said second differentiating means for activation by such delayed pulse to provide a gating pulse, a gating device having an input coupled to the output of said second multivibrator and to said interconnecting means to pass signals from the latter upon the occurrence of a gating pulse from the former, a third multivibrator coupled to the output of said gating device, and audible alarm means coupled to the output of said third multivibrator to provide an alarm upon the passage of a signal through said gating device.

5. An echo ranging system comprising a source of periodic electrical oscillations, means for keying said source, transducer means coupled to said source for radiating signals derived from said electrical oscillations and receiving corresponding reflected echo signals, indicator means of the recording type, means interconnecting said transducer means and said indicator means for energizing the latter with the electrical output of the former, first differentiating means coupled to said source of oscillations for differentiating a portion of the output thereof, a gating pulse generator comprising a first multivibrator, a second differentiating means and a second multivibrator, said first multivibrator being coupled to the output of said first differentiating means for activation in unison with said oscillation source under the control of said keying means to provide an output wave having a leading and a lagging edge, said second differentiating means being connected to the output of said first multivibrator to produce a delayed pulse corresponding in time with such lagging edge, and said second multivibrator being coupled to the output of said second differentiating means for activation by such delayed pulse to provide a gating pulse, a gating device having an input coupled to the output of said second multivibrator and to said interconnecting means to pass signals from the latter upon the occurrence of a gating pulse from the former, a third multivibrator coupled to the output of said gating device, and audible alarm means coupled to the output of said third multivibrator to provide an alarm upon the passage of a signal through said gating device.

6. An echo ranging system comprising a source of periodic electrical oscillations, means for keying said source, transducer means coupled to said source for radiating signals derived from said electrical oscillations and receiving corresponding reflected echo signals, indicator means of the flashing light type, circuit means interconnecting said transducer means and said indicator means for energizing the latter with the electrical output of the former, first differentiating means coupled to said source of oscillations for differentiating a portion of the output thereof, a gating pulse generator comprising a first multivibrator, a second differentiating means and a second multivibrator, said first multivibrator being coupled to the output of said first differentiating means for activation in unison with said oscillation source under the control of said keying means to provide an output wave having a leading and a lagging edge, said second differentiating means being connected to the output of said first multivibrator to produce a delayed pulse corresponding in time with such lagging edge, said second multivibrator being coupled to the output of said second differentiating means for activation by such delayed pulse to provide a gating pulse, a gating device having an input coupled to the output of said second multivibrator and to said interconnecting means to pass signals from the latter upon the occurrence of a gating pulse from the former, a third multivibrator coupled to the output of said gating device, and audible alarm means coupled to the output of said third multivibrator to provide an alarm upon the passage of a signal through said gating device.

References Cited in the file of this patent

UNITED STATES PATENTS

| | | |
|---|---|---|
| 1,667,540 | Dorsey | Apr. 28, 1928 |
| 2,268,587 | Guanella | Jan. 6, 1942 |
| 2,333,688 | Shepard | Nov. 9, 1943 |
| 2,400,309 | Kock | May 14, 1946 |
| 2,428,058 | Wise | Sept. 30, 1947 |
| 2,491,020 | Winchel | Dec. 13, 1949 |
| 2,494,339 | Keister | Jan. 10, 1950 |
| 2,527,769 | Sinsheimer | Oct. 31, 1950 |
| 2,710,787 | Witt | June 14, 1955 |
| 2,788,509 | Bolzmann | Apr. 9, 1957 |

FOREIGN PATENTS

| | | |
|---|---|---|
| 640,504 | Great Britain | July 19, 1950 |

OTHER REFERENCES

Radar Electronic Fundamentals, Navships 900,016, Bureau of Ships, Navy Department, June, 1944. Page 170 relied on.